United States Patent [19]
Ryswick

[11] 3,829,147
[45] Aug. 13, 1974

[54] FORCE-RESPONSIVE ELASTOMERIC GRIPPER

[75] Inventor: Edward L. Ryswick, Rochester, N.Y.

[73] Assignee: Varispace Industries, Inc., Rochester, N.Y.

[22] Filed: Aug. 7, 1972

[21] Appl. No.: 278,419

[52] U.S. Cl.................... 294/93, 192/54, 242/72
[51] Int. Cl............................................ B25b 27/00
[58] Field of Search .... 294/93, 86.24, 86.25, 86.26, 294/86.32, 94; 166/196, 180, 181; 279/2, 1 Q, 96, 102; 269/48.1; 242/72, 72.1, 46.4; 74/99, 99 A, 56; 192/54, 79, 65, 76

[56] References Cited
UNITED STATES PATENTS
| | | | |
|---|---|---|---|
| 1,681,596 | 8/1928 | Reichard | 294/86.24 X |
| 2,952,418 | 9/1960 | Rice | 242/72.1 |
| 2,978,915 | 4/1961 | Metcalf | 74/99 X |
| 3,097,859 | 7/1963 | Sindelar | 279/96 X |
| 3,113,744 | 12/1963 | Nisenson | 279/2 X |
| 3,374,685 | 3/1968 | Eheim | 74/56 |
| 3,584,714 | 6/1971 | Ryswick | 192/54 |

FOREIGN PATENTS OR APPLICATIONS
| | | | |
|---|---|---|---|
| 575,258 | 2/1946 | Great Britain | 279/96 |

*Primary Examiner*—Richard A. Schacher
*Assistant Examiner*—James L. Rowland
*Attorney, Agent, or Firm*—Cumpston, Shaw & Stephens

[57] ABSTRACT

A gripper with fixed and movable flanges squeezed together axially as a function of applied force to move an elastomeric ring radially for gripping uses an elastomeric ring that has a crowned gripping surface that is generally convex in axial cross section when the ring is unstressed. The opposite surface of the ring is generally concave in axial cross section, and the ring is supported on a cylindrical surface so that the axially central region of the ring is free to move radially toward the support surface. Such a ring can grip the outside of the shaft or the inside of a core for turning or lifting. Also, several improved actuators drive the movable flange as a function of the applied force.

15 Claims, 13 Drawing Figures

3,829,147

FORCE-RESPONSIVE ELASTOMERIC GRIPPER

THE INVENTIVE IMPROVEMENT

It is generally known that an elastomeric gripper can be squeezed between a pair of flanges to expand radially for gripping, and the squeeze applied has been related to driving torque. Practical experience with grippers of this sort has led to discovery of an improved shape for the elastomeric gripping ring to assure that the desired gripping occurs in spite of small variations in the size of cores or shafts to be gripped. The invention also recognizes ways that such a gripper can be extended to form an expandable shaft and can be applied to lifting cores wound with webbing. Also, better ways for moving the flanges have been devised, and these improvements have been combined by the invention to form more successful and workable tools. The invention aims at improving elastomeric grippers to enhance their versatility, make them simple, economical, and reliable, and extend their range of usefulness to different gripping tasks and different sized articles to be gripped.

SUMMARY OF THE INVENTION

The invention applies to a force-responsive elastomeric gripper having a fixed flange and a flange movable axially as a function of applied force with an elastomeric ring squeezed axially between the flanges for moving radially for gripping. The elastomeric ring in unstressed condition has a crowned gripping surface that is generally convex in axial cross section, and the surface of the elastomeric ring opposite the gripping surface is generally concave in cross section. A generally cylindrical surface supports the elastomeric ring so the axially central region of the ring is free to move radially toward the support surface. The invention includes better cams for driving the movable flange, and application of such a gripper to inside gripping of a core, outside gripping of a shaft, lifting a core wound with web, and forming an expandable shaft of substantial length.

DRAWINGS

Figure 8:
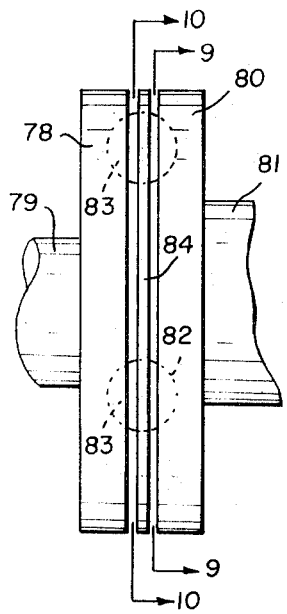
FIG. 8 is a fragmentary, elevational view of another preferred cam drive for the inventive gripper.
Figure 9:
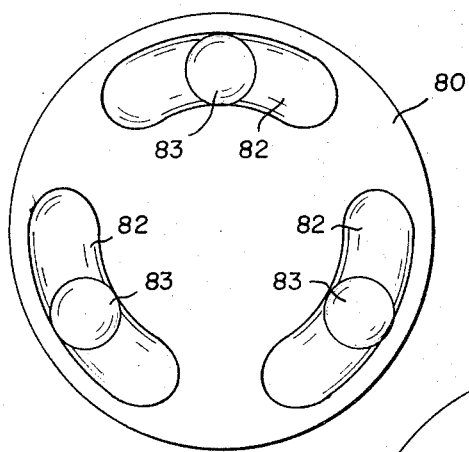
Figure 10:
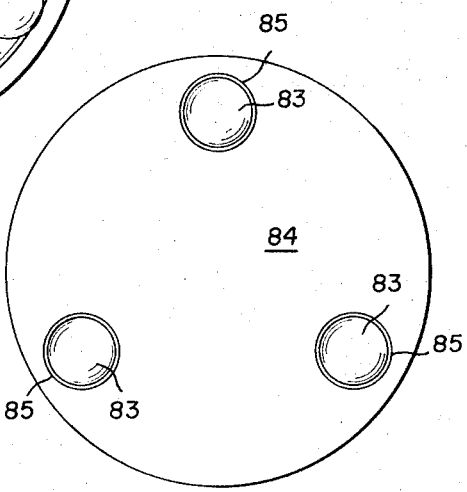
Figure 11:
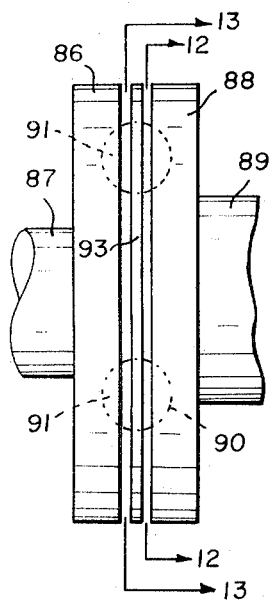
Figure 12:
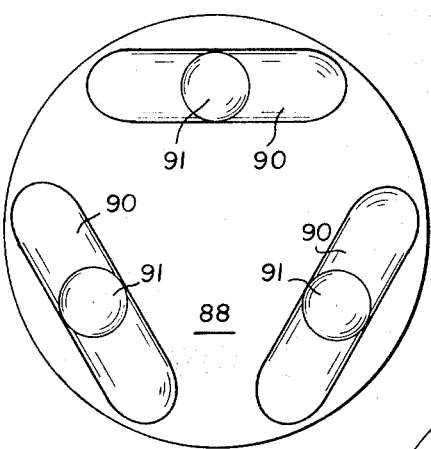
Figure 13:
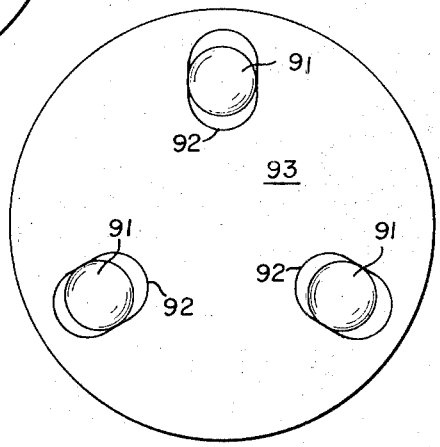

FIGS. 9 and 10 are cross-sectional views of the gripper of FIG. 8 taken respectively along the lines 9 — 9 thereof, and 10 — 10 thereof;

FIG. 11 is a fragmentary, elevational view of another preferred cam drive for the inventive gripper; and FIGS. 12 and 13 are cross-sectional views of the cam drive of FIG. 11 taken respectively along the lines 12 — 12 thereof, and 13 — 13 thereof.

Figure 1:
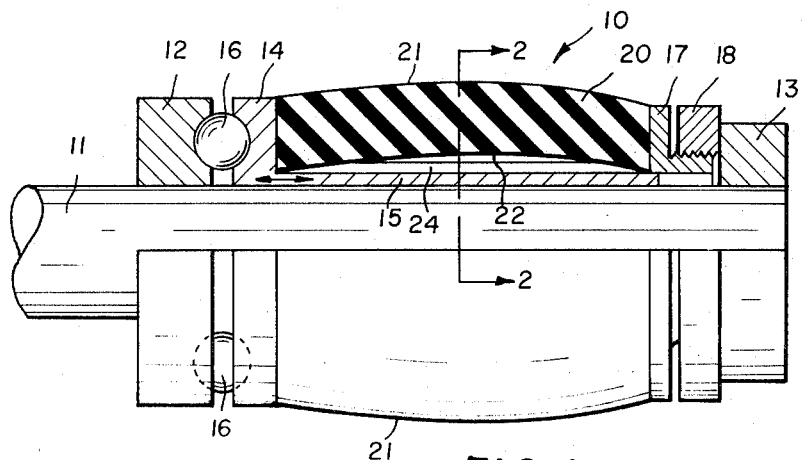
FIG. 1 is a partially schematic, partially sectioned view of a preferred embodiment of the invention.

DETAILED DESCRIPTION:

Gripper 10 of FIG. 1 shows a partially schematic, preferred form of the invention arranged on a shaft 11. A flange 12 and a collar 13 are fixed to shaft 11, and a flange 14 and sleeve 15 are movable axially of shaft 11. Cam means schematically represented by ball bearings 16 drives movable flange 14 and sleeve 15 back and forth axially of shaft 11 as represented by the arrows as a function of the relative rotation between cams 12 and 14 in response to the torque applied to shaft 11. A fixed flange engaging collar 13 is formed of two parts 17 and 18 that are screw threaded together and axially adjustable by turning part 17 relative to part 18 with a tool such as a spanner wrench. Axial adjustment of flange parts 17 and 18 is provided when desired for pre-tensioning gripper 10.

Figure 2:
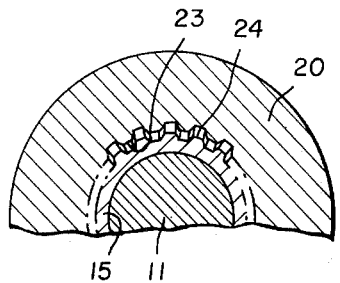
FIG. 2 is a cross-sectional view of the gripper of FIG. 1 taken along the line 2 — 2 thereof.

The gripping element of gripper 10 is an elastomeric ring 20 preferably shaped as illustrated with a crown 21 so that the outer gripping surface of ring 20 is convex in the illustrated axial cross section. The opposite surface 22 of ring 20 is concave in axial cross section to conform generally to crowned surface 21. Convex surface 21 and concave surface 22 can be smoothly curved or have linear portions. Since sleeve 15 is generally cylindrical, a clearance space is provided between sleeve 15 and concave surface 22 so that the central region of ring 20 in the neighborhood of crown 21 is free to move radially inward against sleeve 15. For some applications it is preferred that ring 20 and sleeve 15 have mating splines 23 and 24 as best shown in FIG. 2 to prevent rotational shifting of ring 20.

The convex crown 21 in ring 20 brings ring 20 into frictional engagement with cores having inside diameters that just fit crown 21, and also allows gripper 10 to be pushed into somewhat smaller cores that force crown 21 and concave surface 22 radially inward to press surface 22 snugly against sleeve 15. This allows ring 20 to fit cores varying a quarter of an inch or so in diameter. Also, crown 21 tends to provide a friction grip along a central region that enlarges axially as ring 20 is squeezed in response to applied force. For applications requiring a minimum gripping force at all times, axially adjustable flange parts 17 and 18 provide a pre-tension adjustment for gripper 10. Crowned ring 20 has been found to be a powerful, effective, and versatile gripper in experience with a wide range of gripping tools, and its convex/concave shape contributes significantly to its success.

Figure 3:
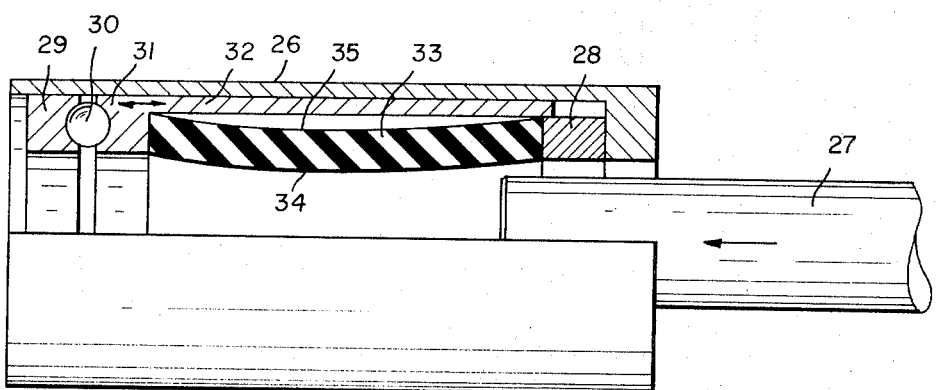
FIG. 3 is a partially schematic, axially cross-sectional view of a preferred embodiment of the inventive gripper arranged for gripping a shaft.

Gripper 25 of FIG. 3 is arranged in a tube 26 for gripping a shaft 27 shown as only partially inserted in gripper 25. Fixed flanges 28 and 29 are arranged inside tube 26, and ball bearing cams 30 move flange 31 in sleeve 32 axially of tube 26 as shown by the arrows. Elastomeric ring 33 extends around the inside of sleeve 32 between fixed flange 28 and movable flange 31. Ring 33 has an inwardly convex surface 34 forming the preferred crown for gripping shaft 27, and the opposite surface 35 of ring 33 is concave in axial cross section to allow clearance between ring 33 and sleeve 32 for radial expansion of ring 33 to receive somewhat larger shafts 27. Increasing torque applied to tube 26 moves flange 31 to squeeze gripper ring 33 for a tighter grip on shaft 27.

Figure 4:
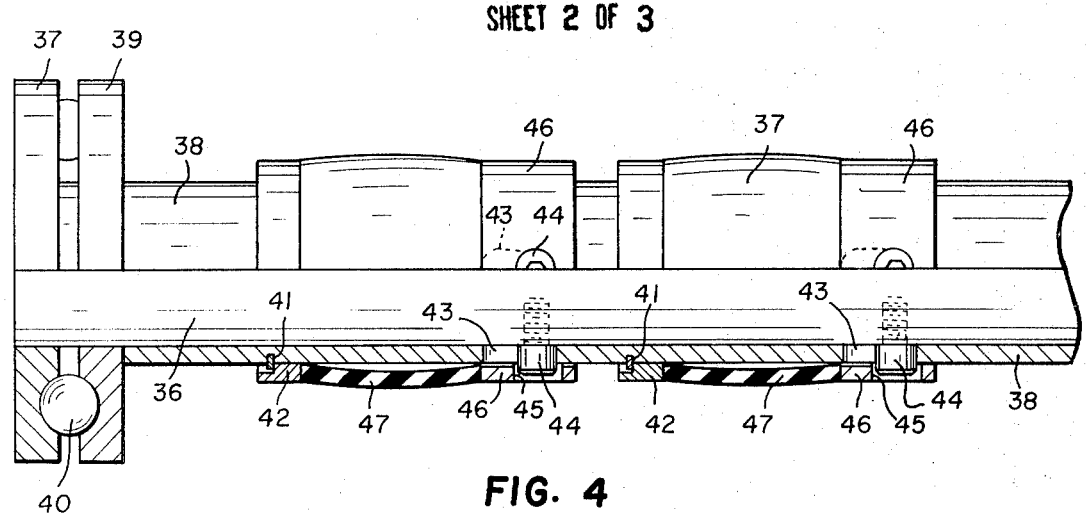
FIG. 4 is a fragmentary, partially sectioned, elevational view of a preferred arrangement of multiple grippers forming an expandible shaft.

FIG. 4 shows a fragment of an expandable shaft using a series of the inventive grippers. Shaft 36 carries a fixed flange 37 and is enclosed in an axially movable sleeve 38 connected to movable flange 39. A cam arrangement using balls 40 moves flange 39 axially as a function of the torque applied to shaft 36 for moving sleeve 38 axially of shaft 36 as shown by the arrows. Snap rings 41 are snapped around sleeve 38 at intervals along its length to form abutments for sleeve flanges or collars 42. Sleeve 38 also has axially oriented slots 43 at intervals along its length for loosely receiving screws 44 whose heads extend through holes 45 in sleeves or collars 46 when screws 44 are driven into shaft 36. Collars 46 are then fixed axially of shaft 36 by screws 44, but sleeve 38 can slide axially inside collars 46 as slots 43 move back and forth relative to screws 44. Crowned elastomeric rings 47 as previously described are carried on sleeve 38 between sleeve flanges 42 and fixed flanges or collars 46, and each ring 47 is independently and uniformly squeezed between flanges 42 and 46 as sleeve 38 is driven axially of shaft 36 in response to applied torque. Rings 47 are then uniformly and equally expanded radially to form a uniformly expandible shaft of any required length.

Figure 5:
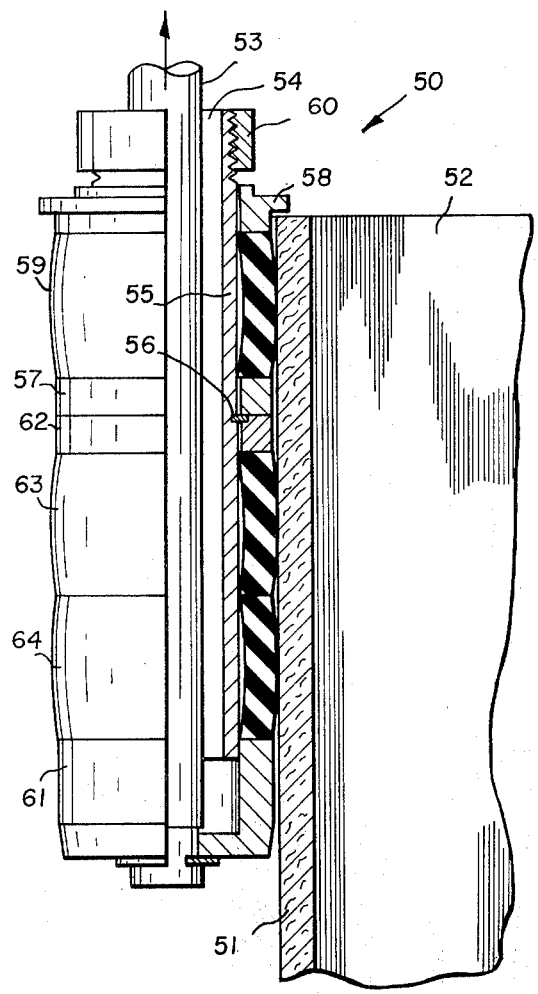
FIG. 5 is a partially schematic, partially sectioned, elevational view of a preferred embodiment of the inventive gripper for use as a lifting tool.

Lifter 50 of FIG. 5 applies the inventive gripper as a lifting tool for picking up core 51 with its web-winding 52 by gripping the inside of core 51. Shaft 53 is pulled upward as indicated by the arrow in the lifting process, and shaft 53 moves axially within a housing 54 and sleeve 55. A snap ring 56 on sleeve 55 locates a sleeve flange 57, and a movable flange 58 can be driven downward to squeeze a crowned elastomeric ring 59 such as previously described for expanding ring 59 tightly against the upper end of core 51. A nut 60 threaded on sleeve 55 can be used for driving movable flange 58 downward, or lever or toggle arrangements for lifting shaft 53 can be connected for automatically forcing flange 58 downward at the same time shaft 53 is pulled upward. With either automatic or manual forcing of flange 58 downward, ring 59 is forcefully driven against core 51 to fix the upper portion of lifter 50 tightly in core 51. Another flange 62 is located on sleeve 55 by snap ring 56 and a flange 61 on the bottom of shaft 53 is lifted upward as shaft 53 is raised in lifting core 51. A pair of crowned elastomeric rings 63 and 64 are carried on sleeve 55 between flanges 62 and 61, and rings 63 and 64 are squeezed axially as flange 61 rises with shaft 53.

Since ring 59 establishes a firm engagement with core 51, sleeve 55 and flange 62 cannot move upward in core 51. This traps rings 63 and 64 securely between flanges 61 and 62 so that rings 63 and 64 are forced radially outward in a frictional grip that is stronger as the lifted weight increases. In effect, the movable flange 62 for lifter 50, although movable relative to shaft 53, is axially fixed relative to core 51 by the squeezing of ring 59 into core 51. With automatic squeezing of ring 59 as shaft 53 is lifted, all three rings 59, 63 and 64 have a force-related grip on core 51 for ensuring that core 51 will not slip off of lifter 50.

Figure 6:
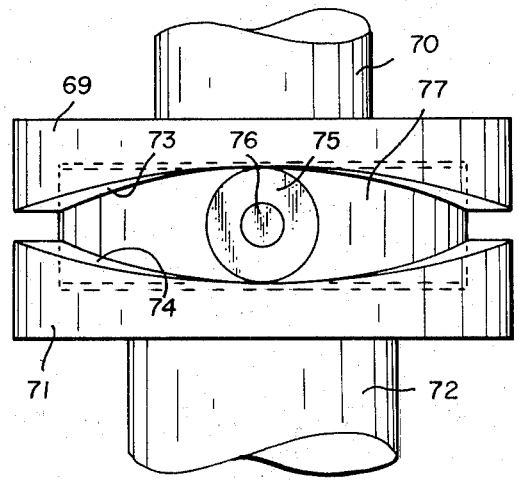
FIG. 6 is a fragmentary, elevational view of a preferred cam drive for the inventive gripper.
Figure 7:
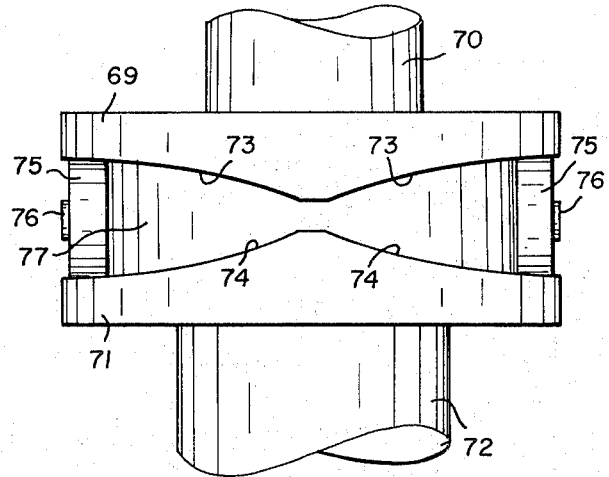
FIG. 7 is a side elevational view of the cam drive of FIG. 6.

FIGS. 6 and 7 show a preferred cam arrangement for axially separating a fixed flange 69 on shaft 70 and a movable flange 71 carrying sleeve 72 as a function of torque applied to shaft 70. Confronting cam tracks 73 and 74 are formed in flanges 69 and 71, and a pair of rollers 75 carried on axles 76 supported in a ring 77 on flange 69 engage each of the cam surfaces 73 and 74. As flange 69 rotates relative to flange 71, cam tracks 73 and 74 move relative to rollers 75 so that rollers 75 roll into increasingly shallower portions of cam tracks 73 and 74 and thereby spread apart flanges 69 and 71 as a function of the applied torque. The cam arrangement of FIGS. 6 and 7 is simple, compact, and especially useful for smaller sized core grippers.

FIGS. 8 – 10 show another cam arrangement for separating flange 78 carried on shaft 79 and a relatively movable flange 80 carrying a sleeve 81 for operating the inventive gripper. Flanges 78 and 80 each have concentric, confronting cam grooves 82 that are arcuate and have deep central regions and shallow end regions. Ball bearings 83 are trapped in confronting cam grooves 82 and retained in holes 85 in a ball cage plate 84. As flange 78 turns relative to flange 80, balls 83 are driven toward the ends of recesses 82, and since recesses 82 are shallower at their ends than at their centers, flanges 78 and 80 are spread apart for operating the inventive gripper.

A similar cam arrangement is shown in FIGS. 11 – 13 for separating a flange 86 on shaft 87 and a flange 88 carrying a sleeve 89 for use in squeezing the inventive gripper. Flanges 86 and 88 have confronting cam grooves 90 that are generally linear and symmetrically and concentrically arranged around the axis of rotation of flanges 86 and 88. Ball bearings 91 are trapped between confronting grooves 90 and held in holes 92 in ball cage plate 93. Grooves 91 are deep in their centers and shallow at their ends so that when flange 86 rotates relative to flange 88, confronting grooves 90 move to cross each other at increasingly acute angles and at the same time drive balls 91 toward the shallow ends of grooves 90 for spreading flanges 86 and 88 apart to squeeze the inventive gripper.

The cam arrangements illustrated in FIGS. 6 – 13 can use different numbers of rollers, balls, grooves and cam surfaces, and the general tendency is to increase the number of camming elements as the diameter of the gripper increases. Any of these camming arrangements can be used for squeezing the inventive gripper in torque responsive applications, and such cam arrangements combine effectively with other features of the invention for producing more efficient, reliable, and economical grippers. All of these use the preferred crowned elastomeric ring and as shown by the illustrated embodiments, they include similar features and concepts.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will understand the adaptation of the invention to various core and shaft-gripping applications.

I claim:

1. In a force-responsive, elastomeric gripper having a rotatable member carrying an axially fixed flange, a flange and sleeve movable axially relative to said fixed flange as a function of the rotational torque applied to said member, cam means for moving said movable flange axially toward said fixed flange as said torque turns said fixed flange relative to said movable flange, and an elongated elastomeric ring supported on said sleeve between said fixed flange and said movable flange to be squeezed axially between said flanges for moving radially for gripping as said movable flange moves toward said fixed flange, the improvement comprising:
 a. said elastomeric ring extending from said fixed flange to said movable flange;
 b. said elastomeric ring in unstressed condition having a gripping surface that is crowned in an axially central region and is generally convex in axial cross-section;
 c. the surface of said elastomeric ring opposite said gripping surface being generally concave in axial cross section in said unstressed condition;
 d. said sleeve having a generally cylindrical surface engaging and supporting each end region of said elastomeric ring in said unstressed condition, said cylindrical surface being spaced from said axially central region of said elastomeric ring in said unstressed condition only by said concavity of said opposite surface;
 e. said axially central region of said elastomeric ring being forceable radially into engagement with the full axial length of said cylindrical support surface; and
 f. said support surface of said sleeve and said opposite surface of said elastomeric ring having mating ridges and grooves preventing relative rotation between said sleeve and said elastomeric ring.

2. The gripper of claim 1 wherein said gripping surface of said elastomeric ring faces radially outward for gripping the inside of a core.

3. The gripper of claim 1 wherein said gripping surface of said elastomeric ring faces radially inward for gripping the outside of a shaft.

4. The gripper of claim 1 wherein said mating ridges and grooves of said opposite surface of said elastomeric ring and said support surface of said sleeve are arranged as mating splines.

5. The gripper of claim 1 wherein said cam means comprises opposed, arcuate, and relatively rotatable cam surfaces having deep central regions and relatively shallow end regions, and ball bearings between said cam surfaces for spreading said cam surfaces apart as a function of the relative rotation of said cam surfaces positioning said ball bearings at various depths in said cam surfaces.

6. The gripper of claim 5 including a retainer plate between said cam surfaces and having apertures for holding said ball bearings.

7. The gripper of claim 1 wherein said cam means comprises opposed, linear, and relatively rotatable cam surfaces arranged symmetrically around the axis of rotation of said cam surfaces, said cam surfaces having deep central regions and relatively shallow end regions, and ball bearings between said cam surfaces for spreading said cam surfaces apart as a function of the relative rotation of said cam surfaces positioning said ball bearings at varying depths in said cam surfaces.

8. The gripper of claim 7 including a retainer plate between said cam surfaces and having apertures for holding said ball bearings.

9. The gripper of claim 8 having three opposed pairs of said cam surfaces arranged parallel with the legs of an equilateral triangle.

10. The gripper of claim 1 wherein said cam means comprises pairs of opposed arcuate cam surfaces and a pair of rollers rotatable between said pairs of cam surfaces for spreading said cam surfaces apart as a function of the relative rotation of said cam surfaces positioning said rollers at various rises on said opposed pairs of cam surfaces.

11. The gripper of claim 1 wherein said member is a shaft having a plurality of said fixed flanges; said sleeve is movable axially of said shaft radially inside said fixed flanges and carries a plurality of said movable flanges; and a plurality of said elastomeric rings are arranged around said sleeve between said fixed flanges and said movable flanges.

12. The gripper of claim 1 including means for axially adjusting one of said flanges to pretension said elastomeric ring.

13. The gripper of claim 12 wherein said axial adjustment means comprises two flange parts axially threaded together.

14. A force-responsive, elastomeric gripper comprising:
 a. a lifting shaft;
 b. a flange fixed to a lower region of said lifting shaft;
 c. a flange and sleeve movable axially relative to said fixed flange and said shaft as a function of the axial lifting force applied to said shaft;
 d. an elongated elastomeric ring supported on said sleeve and extending between said fixed flange and said moving flange to be squeezed axially between said flanges for moving radially for gripping the inside of a core as the space between said flanges reduces;
 e. said elastomeric ring in unstressed condition having a gripping surface that is crowned in an axially central region and is generally convex in axial cross section;
 f. the surface of said elastomeric ring opposite said gripping surface being generally concave in axial cross section in said unstressed condition;
 g. said sleeve having a generally cylindrical surface engaging and supporting each end region of said elastomeric ring in said unstressed condition, said cylindrical sleeve being spaced from said axially central region of said elastomeric ring in said unstressed condition only by said concavity of said opposite surface;
 h. said axially central region of said elastomeric ring being forceable radially into engagement with the full axial length of said cylindrical support surface;
 i. means for firmly engaging the inside of an upper end region of said core to hold said movable flange in place and to initially position said gripper relative to said core;
 j. said elastomeric ring being further inward into said core from said initial core engaging means; and
 k. said fixed flange being further inward into said core from said elastomeric ring so that axially upward lifting motion of said shaft relative to said initial core-engaging means raises said fixed flange and squeezes said elastomeric ring radially outward for gripping, in addition to said initial core engaging means, and lifting said core as a function of said lifting force.

15. The gripper of claim 14 wherein said initial core-engaging means includes another one of said elastomeric rings around said sleeve, and means for squeezing said other elastomeric ring radially outward for said firm engagement with said core.

* * * * *